(12) United States Patent
Dantlgraber

(10) Patent No.: US 7,306,447 B2
(45) Date of Patent: Dec. 11, 2007

(54) INJECTION UNIT COMPRISING A SPINDLE DRIVE AND HYDRAULIC SUPPORT

(75) Inventor: Joerg Dantlgraber, Lohr am Main (DE)

(73) Assignee: Bosch Rexroth AG, Stuttgart (DE)

( * ) Notice: Subject to any disclaimer, the term of this patent is extended or adjusted under 35 U.S.C. 154(b) by 20 days.

(21) Appl. No.: 10/573,800

(22) PCT Filed: Nov. 10, 2004

(86) PCT No.: PCT/DE2004/002486

§ 371 (c)(1),
(2), (4) Date: May 24, 2006

(87) PCT Pub. No.: WO02/11969

PCT Pub. Date: Feb. 14, 2002

(65) Prior Publication Data

US 2007/0020354 A1    Jan. 25, 2007

(30) Foreign Application Priority Data

Nov. 25, 2003   (DE) ................ 103 54 954

(51) Int. Cl.
   *B29C 45/48*   (2006.01)
   *B29C 45/50*   (2006.01)
   *B29C 45/54*   (2006.01)

(52) U.S. Cl. ............... 425/145; 425/149; 425/150; 425/214; 425/574; 425/583; 425/587

(58) Field of Classification Search ............... 425/214, 425/582, 583, 587, 145, 150, 149, 574
See application file for complete search history.

(56) References Cited

U.S. PATENT DOCUMENTS

| | | | |
|---|---|---|---|
| 5,935,494 A | | 8/1999 | Wurl et al. |
| 6,108,587 A | * | 8/2000 | Shearer et al. ............. 700/200 |
| 6,299,427 B1 | * | 10/2001 | Bulgrin et al. ............. 425/145 |
| 6,379,119 B1 | | 4/2002 | Truninger |
| 6,555,035 B2 | * | 4/2003 | Iimura et al. ............. 264/40.1 |
| 2002/0056935 A1 | * | 5/2002 | Gruber et al. ............. 264/40.3 |
| 2004/0065974 A1 | | 4/2004 | Dantlegraber |

FOREIGN PATENT DOCUMENTS

| | | |
|---|---|---|
| DE | 101 35 516 A1 | 7/2001 |
| DE | 101 04 109 | 9/2002 |
| DE | 102 39 591 B4 | 4/2006 |
| EP | 0 760 277 A1 | 3/1997 |
| EP | 0 785 059 A1 | 7/1997 |
| JP | A-2000-218666 | 8/2000 |
| WO | WO 02/04193 A1 | 1/2002 |
| WO | WO 02/11969 A1 | 2/2002 |

OTHER PUBLICATIONS

"Grundlagen Der Hysraulischen Schaltungstechnik." Olhydraulik Und Pneumatik, Krausskopf Verlag Fur Wirtschaft GMBH. Mainz. DE, vol. 37, No. 8. Aug. 1, 1993 p. 618-621 (XP 000413160).

"Grundlagen Der Hydraulischen Schaltungstechnik." Olhydraulik Und Pneumatik, Vereingte Fachverlage, Mainz, DE, vol. 37, Jan. 1993. p. 677, 678, 680-68. (XP 000195240).

"Grundlagen Der Hydraulischen Schaltungstechnik." Olhydraulik Und Pneumatik, Vereingte Fachverlage, Mainz, DE vol. 38, Jan. 1994 p. 24-27. (XP 000195265).

M. Johannaber, "Handbuch Spritzgiessen", Injection-Moulding Manual, (Nov. 13, 2001) Carl Hanser Verlag, XP002323573 ISBN: 3-446-15632-1, pp. 887-903.

\* cited by examiner

*Primary Examiner*—Tim Heitbrink
*Assistant Examiner*—Seyed Masoud Malekzadeh
(74) *Attorney, Agent, or Firm*—Oliff & Berridge, PLC

(57) ABSTRACT

Disclosed is an injection unit (1) for an injection molding machine, comprising a screw (4) that is driven by means of a spindle drive (18). The spindle drive (18) is driven via an electric motor (6). Additionally, a force that acts in an axial direction is transmitted to the screw of the injection unit (1) via a hydraulic cylinder (38). According to the invention, a pump (48, 68) is driven via the electric motor (6). A pressure chamber (44) of the cylinder (38) can be supplied with more pressurizing means via said pump (48, 68) than is needed during an axial displacement of the plunger (36).

9 Claims, 2 Drawing Sheets

INJECTION UNIT COMPRISING A SPINDLE DRIVE AND HYDRAULIC SUPPORT

In the past, injection molding machines involving comparatively high closing forces were designed with a hydraulically actuated injection and closing unit. In more recent times there is a tendency of replacing at least a part of the hydraulic drive units with electrically operated drive mechanisms such as, e.g., spindle drives.

From DE 101 35 516 A1 an injection unit for an injection molding machine is known, wherein inside a heated cylinder a screw is guided in a rotatable and axially displaceable manner. The screw is driven through the intermediary of a spindle drive, with a spindle being arranged coaxial with the screw and driven by an electric motor. The screw is moreover associated to a hydraulic cylinder, the bottom-side cylinder chamber of which may be connected with a pump or a tank for regulating a backup pressure through a throttle valve. This pump is operated by another electric motor. In order to convey and plastify the plastics granulate, the spindle is driven through the electric motor mentioned first, wherein the spindle nut is mounted so as to be rotatable and axially not displaceable, and jointly rotates. The plastics granulate is melted, conveyed by means of the screw, and by the backup pressure forming in front of the screw in the cylinder the screw is moved in the axial direction to the rear, away from the sprue bush of the injection unit. This backup pressure is regulated through the intermediary of the hydraulic cylinder and suitable adjustment of the throttle valve associated to the latter in accordance with a predetermined pressure development. Following this apportioning and plastifying process, the screw is moved in the axial direction for injection of the molding material. To this end, the spindle nut is immobilized by means of a brake and the direction of rotation of the electric motor is reversed, so that the spindle is moved to the front, towards the injection nozzle of the cylinder. A joint rotation of the screw is at this time prevented by a free-wheel. As a result of this axial advance of the screw, the plastics compound is then injected through the injection nozzle (shut-off nozzle) of the cylinder into the cavity of the mold. This axial advance of the screw is supported by driving the hydraulic cylinder, the cylinder chamber of which is supplied with pressure medium through the intermediary of the named pump. It is a drawback in this solution that the drive mechanisms of the pump and of the spindle drive require a considerable complexity in terms of apparatus and control technology.

From DE 101 04 109 an injection unit is known which has a similar structure as the afore-described solution. I.e., in this solution a considerable complexity in terms of apparatus is equally necessary for driving the pump drive mechanism and the spindle drive.

In DE 102 39 591 an injection unit is described wherein the screw for apportioning and plastifying may be driven by means of an electric motor. The axial displacement of the screw is carried out in the conventional manner by means of a hydraulic cylinder, with the electric motor driving a pump whereby a hydraulic accumulator may be charged which is adapted to be connected with the two pressure chambers of the hydraulic cylinder having the form of a differential cylinder. A drawback of this solution resides in the fact that the actuation of the screw takes place in the conventional manner by means of a hydraulic cylinder.

In EP 0 760 277 A1 an injection unit is disclosed wherein the screw is rotatable by means of a first drive mechanism for plastifying and apportioning. The axial displacement takes place by means of a pinion acting on a toothed rack of the screw, which is driven by a separate electric motor. The screw is moreover connected with a hydraulic cylinder whereby the backup pressure during plastifying may be controlled. This hydraulic cylinder also additionally acts on the screw during the injection process. The electric motor for driving the pinion additionally also drives a pump, through the intermediary of which a pressure accumulator to which a pressure chamber of the cylinder is connected may be charged. This solution also requires a considerable complexity in terms of apparatus, and the patent specification does not contain any hint to a possibility of the backup pressure being regulated through the intermediary of the hydraulic cylinder during plastifying.

In contrast, the invention is based on the object of furnishing an injection unit whereby plastifying and injecting may be controlled at minimum complexity in terms of apparatus.

This object is achieved through an injection unit having the features of claim 1.

In accordance with the invention, the injection unit comprises a screw adapted to be rotatingly driven by means of a spindle drive for apportioning molding material. Moreover to the spindle a hydraulic cylinder is associated which additionally acts on the screw in the axial direction. In accordance with the invention, the hydraulic cylinder is supplied with pressure medium through a pump means driven by the one motor which is also used for driving the spindle drive. The pump means is designed such that for the purpose of adjusting the pressure acting on the screw, the hydraulic cylinder is supplied with somewhat more pressure medium than necessary.

The excess quantity may, in accordance with an advantageous development of the invention, be carried off via an adjustable throttle valve to a tank or used for charging a hydraulic accumulator. I.e., by adjusting the throttle valve it is then possible, for instance, to regulate a backup pressure during plastifying.

In a variant of the invention, the pump means has the form of a piston pump, the plunger piston of which is adapted to be driven by a spindle assembly which in turn is adapted to be driven by the motor of the spindle drive.

In this variant the spindle assembly is connected with the motor through a clutch, so that for instance for plastifying the clutch is released and engages during injecting, so that the rotating movement of the electric motor is converted into an axial displacement of the plunger piston, so that the axial movement of the screw is supported by the built-up pressure. For the purpose of returning the plunger piston, in this solution there is provided between the electric motor and the drive mechanism of the spindle drive an additional clutch which is released during retraction, so that the plunger piston may be returned into its basic position independently of the spindle drive.

As an alternative for the afore-described embodiment in which the electric motor is connected through clutches with the spindle drive and a plunger pump, a conventional pump means may also be driven directly by the motor, wherein for plastifying a bypass valve is controlled open whereby a bypass line is controlled open through which the outlet of the pump is connected with the tank, wherein the pressure medium discharge from the hydraulic cylinder is determined solely by the effect of the throttle valve.

In accordance with the invention it is preferred if between the spindle assembly and the screw a free-wheel is provided which acts in such a manner during the injection process that the screw may be shifted in axial displacement without rotation.

A spindle nut of the spindle drive may advantageously be immobilized by means of a brake.

Preferably the annular chamber of the hydraulic cylinder is connected to the pump and via the throttle valve to the tank or to the hydraulic accumulator. A bottom-side cylinder chamber of the hydraulic accumulator is preferably subjected to a constant pressure of an additional hydraulic accumulator.

Further advantageous developments of the invention are subject matter of further subclaims.

In the following, preferred embodiments of the invention are explained in more detail by referring to schematic drawings, wherein.

Figure 1:
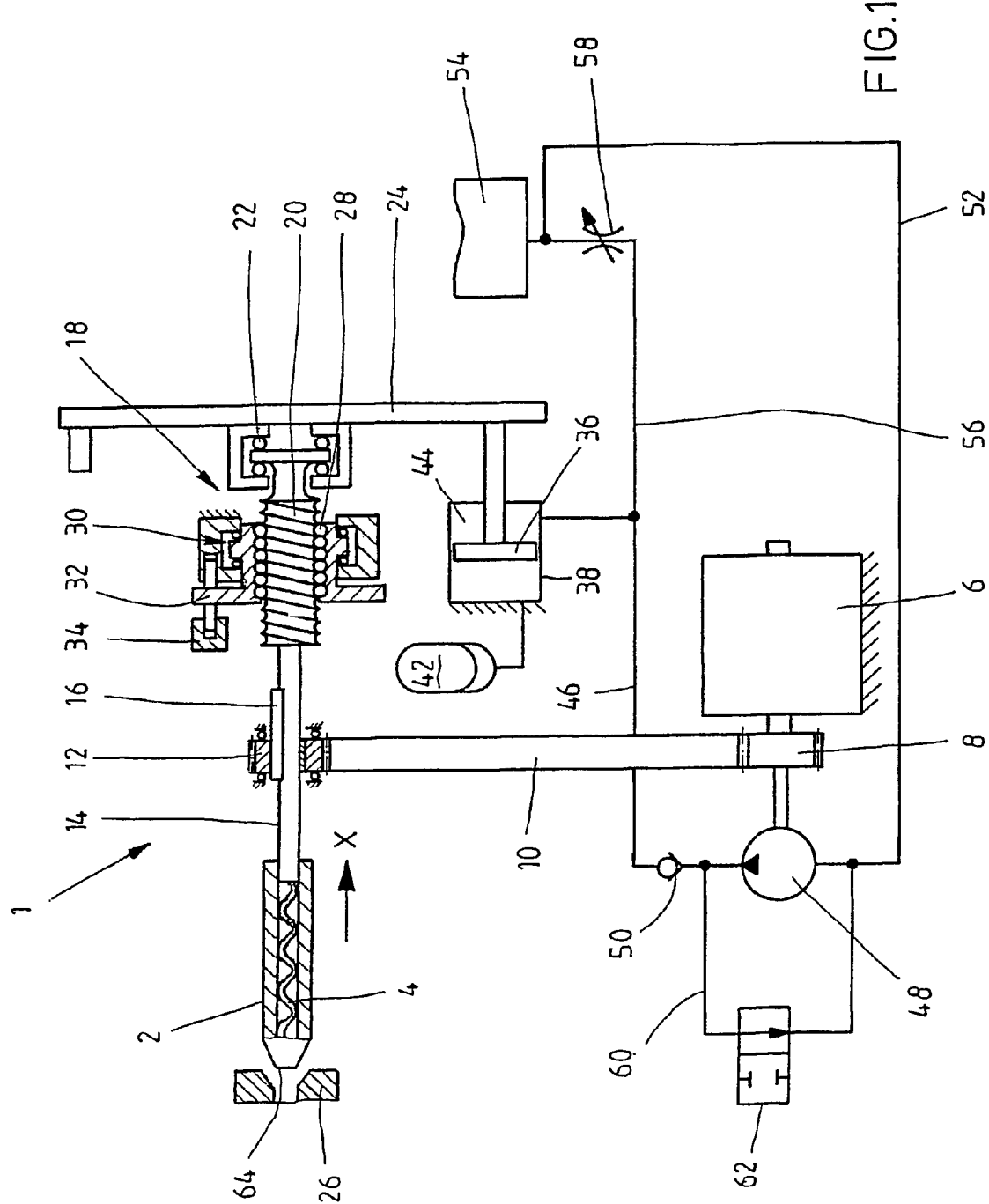
FIG. 1 is a schematic view of a preferred embodiment of an injection unit.

In FIG. 1 a schematic diagram of an injection unit 1 of an electro-hydraulically driven injection molding machine is represented. The injection unit 1 comprises a heatable cylinder wherein a screw 4 is received so as to be rotatable and axially displaceable. The rotary drive of the screw 4 is achieved through the intermediary of an electric motor 6 which is in operative connection with an end portion 14 of the screw 4 protruding from the cylinder 2 via a pinion 8, a toothed belt 10, and a gear 12. The gear 12 is immobilized in the axial direction by an axial bearing and non-rotatably connected through one or several feather keys 16 with the end portion 14 of the screw 4 such that the latter is axially displaceable relative to the gear 12.

The end portion of the screw 14 is connected with a spindle drive 18 whereby the screw 4 may be displaced in the axial direction.

This spindle drive 18 comprises a spindle 20 which is supported in the axial direction on a frame 24 of the injection unit 1 by means of an axial bearing 22. This frame 24 in turn is mounted with the aid of guide members (not shown) on the bed of the injection molding machine and movable relative thereto, jointly with the injection unit, in the axial direction by hydraulic or electric actuation elements (not shown), so that the injection unit 1 may be taken into contact with a sprue bush 26 of a mold which is clamped to the backing plates of a closing unit for injection.

The spindle 20 meshes with a spindle nut 28 having the form of a circulating ball nut in the represented embodiment. The spindle nut 28 is immobilized in the axial direction by means of an axial bearing assembly 30, so that the spindle 20 is movable in the axial direction relative to the spindle nut 28.

The spindle nut 28 has a radially protruding, disk brake-type brake collar 32 on which a brake 34 attacks in order to immobilize the spindle nut 28 such as to be prevented from rotation.

In addition a differential piston 36 of a hydraulic cylinder 38 is supported on the frame 24. A bottom-side cylinder chamber 40 of the hydraulic cylinder 36 is connected with a hydraulic accumulator 42, while an annular chamber 44 is connected via a pressure line 46 with the pressure port of a pump 48. The pump 48 is—in accordance with the indication in FIG. 1—also driven by means of the electric motor 6. Between pump 48 and hydraulic cylinder 38 a check valve 50 is provided which opens in the direction to the latter and prevents a pressure medium flow from the cylinder 38 towards the pump 48. The intake port of the pump 48 is connected via an intake line 52 with a flexible, closed tank 54. From the pressure line 46 a drain line 56 branches which is connected to the tank 54 via an adjustable throttle valve 58.

From the line portion between the check valve 50 and the pressure port of the pump 48 a bypass line 60 branches in which a bypass valve 62 is provided.

The operation of the injection molding unit is as follows:

For plastifying (apportioning and melting the molding material) the electric motor 6 is actuated, the bypass valve 62 is taken into its represented opened position, so that the pressure medium conveyed by the pump 48 may flow back via the bypass line 60 and the bypass valve 62 as well as the intake line 52 to the tank 54. By means of the toothed belt drive (8, 10, 12) the end portion 14 of the screw 4 is rotated, wherein the brake 32 is released, so that the spindle nut 28 performs a rotating movement in its axially immobilized position. By the rotating movement of the screw 4, plastics granulate is conveyed out of a storage container (not shown) into the cylinder 2 and melted and homogenized there.

The molten molding material is then conveyed via the screw 4 into a retaining space adjacent an injection nozzle 64 of the cylinder 2. Depending on the force applied to the screw 4 in the direction towards this retaining space, a backup pressure establishes, whereby the screw 4 is shifted back in the direction of arrow X. This axial displacement in the X direction is counteracted by the pressure in the annular chamber 44 of the cylinder 38 which is decreasing in size.

As was mentioned above, this annular chamber 44 is connected via the pressure line 46 and the adjustable throttle valve 58 with the tank 54. By a suitable adjustment of the throttle cross-section of the throttle valve 58 it is possible to throttle the pressure medium draining towards the tank 54, so that the backup pressure manifesting in the cylinder 2 may be adjusted in accordance with a predetermined backup pressure development by altering the effective throttle cross-section of the throttle valve 58.

Following melting and homogenization of the molding material, the bypass valve 62 in the bypass line 60 is taken into its blocking position and the electric motor 6 is reversed, with the direction of rotation being reversed in comparison with plastifying. The brake 34 is engaged, so that a rotation of the spindle nut 30 is prevented. The screw 4 does not perform a rotation as between the end portion 14 and the screw 4 a free-wheel is provided which takes effect in this direction of rotation of the electric motor 6. As a result of the rotation of the end portion 14 and the engagement with the spindle nut 28, the spindle 20 and thus the screw 4 is moved forward in the axial direction, towards the sprue bush 26. This axial displacement is supported by the effect of the hydraulic cylinder 38, for the pump 48 equally driven by the electric motor 6 conveys pressure medium via the pressure line 46 into the annular chamber, so that the latter increases in size and the frame 24 together with the screw 4 is moved to the left in the representation according to FIG. 1—the molten molding material is injected into the cavity of the mold. The pump 48 is configured such that it delivers somewhat more pressure medium than is necessary for the axial size increase of the annular chamber 44. The excess pressure medium quantity may be carried off via the variable cross-section of the throttle valve 58 to the tank 54. I.e., through the adjustment of the throttle valve 58 it is possible to vary the force of the hydraulic cylinder 38 transmitted in the axial direction to the screw 4.

Following injection of the molding material, the entire injection unit 1 is again returned through the intermediary of the drive unit (spindle drive, hydraulic cylinder; not represented) into the basic position represented in FIG. 1, and the cycle (plastifying, injecting) starts from the beginning.

Figure 2:
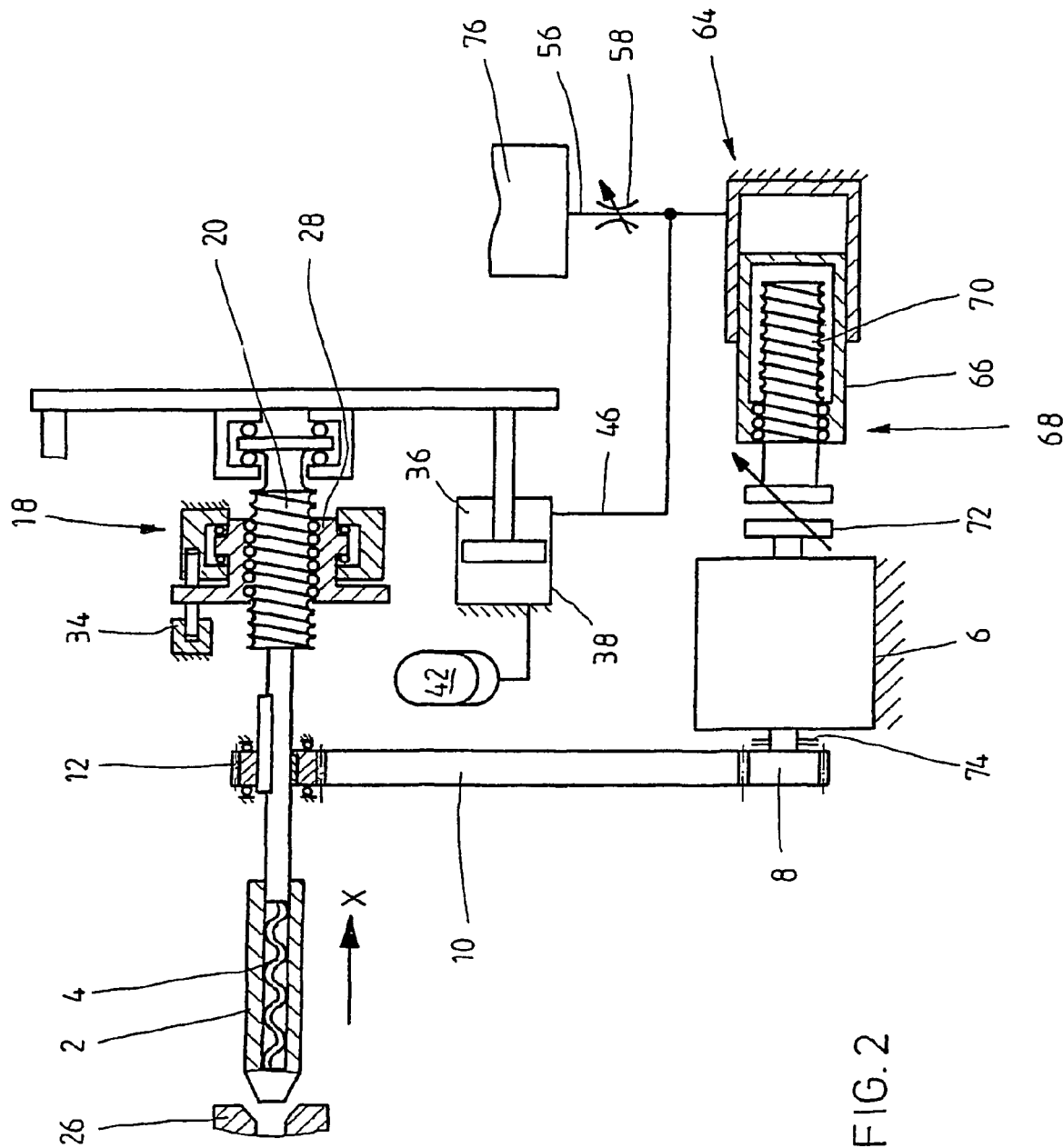
FIG. 2 is a view of a second embodiment comprising a plunger pump.

In FIG. 2 another embodiment of the invention is shown. The basic construction of the injection unit 1 comprising the cylinder 2, the screw 4, the electric motor 6 and the toothed belt drive 8, 10, 12, as well as the spindle drive 18 and the hydraulic cylinder 38 largely corresponds to the afore-described structure, so that reference is made to the previous explanations as concerns the description of these elements.

Instead of the pump 48, in the embodiment represented in FIG. 2 a plunger pump 64 is used, the plunger 66 of which is adapted to be driven by means of a spindle assembly 68. The spindle nut is here formed in the non-rotational plunger 66. This spindle nut meshes with a threaded spindle 70 that is connected through a clutch 72 with the electric motor 6. Between the electric motor 6 and the pinion 8 an additional clutch 74 is provided. Instead of the elastic tank 54, a hydraulic accumulator 76 is used in the embodiment represented in FIG. 2. The pressure port of the plunger pump 64 is connected via the pressure line 46 with the annular chamber 36 of the hydraulic cylinder 38. As in the afore-described embodiment, from the pressure line 46 a drain line 56 leading to the hydraulic accumulator 76 branches off in which the adjustable throttle valve 58 is provided. The operation of this injection unit 1 is as follows:

It shall be assumed that the entire injection unit was returned through the intermediary of the drive mechanism (not shown) into a position in which it contacts the sprue bush 26 no longer.

For plastifying the motor 6 is driven, wherein the clutch 72 is released and the clutch 74 is engaged. Accordingly the screw 4 is driven in the afore-described manner through the electric motor 6 and the toothed belt drive 8, 10, 12. The brake 34 is released, so that the spindle nut 28 is allowed to rotate and the screw 4 is shifted back, i.e., to the right (direction of arrow X) in the representation of FIG. 2, by the backup pressure. The backup pressure may be regulated, just like in the previous embodiment, by a suitable adjustment of the throttle valve 58, whereby the annular chamber 36 reducing in size of the hydraulic cylinders 38 is connected with the hydraulic accumulator 76. Following melting and homogenization of the molding material, the first clutch 72 is engaged, so that the spindle 70 of the spindle assembly 68 is driven and the injection unit 1 is moved forward. The direction of rotation of the electric motor 6 is selected such that the plunger piston 66 is moved to the right in the representation of FIG. 2, so that somewhat more pressure medium is supplied than is necessary for filling the annular chamber 36 that is increasing in size. The excess quantity of the pressure medium is then taken via the adjustable throttle valve 58 to the hydraulic accumulator 76, so that the latter is charged. The brake 34 is engaged, so that the screw 4 is shifted to the left (FIG. 2) by the engagement of the spindle 70 with the spindle nut 28 and by the supporting effect of the hydraulic cylinder 38, and the molding material is injected into the cavity through the shut-off nozzle contacting the sprue bush 26.

In order to initiate the next cycle, the clutch 74 is released, the direction of rotation of the electric motor 6 is reversed, so that the spindle 68 is also rotated in the opposite direction, and correspondingly the plunger piston 66 is extended. In parallel with this or subsequently, the injection unit 1 is then retracted, so that the cylinder 2 rises from the sprue bush 26—the cycle starts anew.

In kinematic reversal it would also be possible for the spindle nut to be driven and the spindle to be immobilized in the axial direction, with the spindle nut then being connected with the screw 4.

What is disclosed is an injection unit for an injection molding machine, comprising a screw which may be driven by means of a spindle drive. Driving of the spindle drive is effected by means of an electric motor. In addition, through the intermediary of a hydraulic cylinder a force acting in the axial direction is transmitted to the screw of the injection unit. In accordance with the invention, the electric motor drives a pump whereby a pressure chamber of the cylinder may be supplied with more pressure medium than is required in an axial displacement of the cylinder.

| List of Reference Symbols | |
|---|---|
| 1 | injection unit |
| 2 | cylinder |
| 4 | screw |
| 6 | electric motor |
| 8 | pinion |
| 10 | toothed belt |
| 12 | gear |
| 14 | end portion of the screw |
| 16 | feather key |
| 18 | spindle drive |
| 20 | spindle |
| 22 | axial bearing |
| 24 | frame |
| 26 | sprue bush |
| 28 | spindle nut |
| 30 | axial bearing assembly |
| 32 | brake collar |
| 34 | brake |
| 36 | piston |
| 38 | hydraulic cylinder |
| 40 | cylinder chamber |
| 42 | hydraulic accumulator |
| 44 | annular chamber |
| 46 | pressure line |
| 48 | pump |
| 50 | check valve |
| 52 | intake line |
| 54 | tank |
| 56 | drain line |
| 58 | throttle valve |
| 60 | bypass line |
| 62 | bypass valve |
| 64 | plunger pump |
| 66 | plunger piston |
| 68 | spindle assembly |
| 70 | threaded spindle |
| 72 | clutch |
| 74 | second clutch |
| 76 | hydraulic accumulator |

The invention claimed is:

1. An injection unit of an injection molding machine, comprising a screw adapted to be axially driven by means of a spindle drive that is not self-locking and is rotatably driven by a motor, and to which a hydraulic cylinder for generating an axial force acting on the spindle drive is associated, characterized in that the motor drives a pump means whereby a first pressure chamber of the hydraulic cylinder may be supplied with more pressure medium than is needed during the axial displacement of the cylinder.

2. The injection unit in accordance with claim 1, wherein a pressure line between the pump assembly and the hydraulic cylinder is connected via a throttle valve with a closed tank or via a hydraulic accumulator.

3. The injection unit in accordance with claim 2, wherein an outlet of the pump assembly is adapted to be connected with the tank via a bypass valve, so that the hydraulic cylinder is supplied with pressure medium not via the pump.

4. The injection unit in accordance with claim 1, wherein the pump assembly is a piston pump, the plunger piston of which is driven through a spindle assembly adapted to be driven by the motor.

5. The injection unit in accordance with claim 4, wherein the spindle assembly is adapted to be connected with the motor through a clutch.

6. The injection unit in accordance with claim 5, wherein the motor is adapted to be connected with the spindle drive through an additional clutch.

7. The injection unit in accordance with claim 1, wherein a second pressure chamber, is connected with a hydraulic accumulator.

8. The injection unit in accordance with claim 1, wherein the screw is connected with the spindle drive through a free-wheel.

9. The injection unit in accordance with claim 1, wherein the spindle nut of the spindle drive is adapted to be immobilized relative to the driven spindle by means of a brake.

* * * * *